(12) United States Patent
Akritidis et al.

(10) Patent No.: US 8,434,064 B2
(45) Date of Patent: Apr. 30, 2013

(54) DETECTING MEMORY ERRORS USING WRITE INTEGRITY TESTING

(75) Inventors: Periklis Akritidis, Cambridge (GB); Manuel Costa, Cambridge (GB); Miguel Castro, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 12/058,513

(22) Filed: Mar. 28, 2008

(65) Prior Publication Data

US 2009/0249289 A1 Oct. 1, 2009

(51) Int. Cl.
*G06F 9/44* (2006.01)
*G06F 9/45* (2006.01)

(52) U.S. Cl.
USPC ........... 717/124; 717/100; 717/106; 717/111; 717/120; 717/121; 717/122; 717/129; 717/135; 717/136; 717/144; 717/156

(58) Field of Classification Search .......................... None
See application file for complete search history.

(56) References Cited

U.S. PATENT DOCUMENTS

| | | | | |
|---|---|---|---|---|
| 5,408,650 A * | 4/1995 | Arsenault | ...................... | 717/124 |
| 5,611,043 A * | 3/1997 | Even et al. | ................. | 714/38.13 |
| 5,909,580 A | 6/1999 | Crelier et al. | | |
| 5,963,972 A * | 10/1999 | Calder et al. | .................. | 711/129 |
| 5,987,626 A * | 11/1999 | Greyzck | ...................... | 714/38.13 |
| 6,493,834 B1 * | 12/2002 | Bates et al. | ................ | 714/38.13 |
| 6,550,056 B1 * | 4/2003 | Mizumoto et al. | ............ | 717/124 |
| 6,993,663 B1 | 1/2006 | Paya et al. | | |
| 7,185,329 B1 * | 2/2007 | Verbitsky | ...................... | 717/156 |
| 7,207,065 B2 * | 4/2007 | Chess et al. | ...................... | 726/25 |
| 8,079,014 B2 * | 12/2011 | Watanabe et al. | ............. | 717/100 |
| 8,127,280 B2 * | 2/2012 | Thomas et al. | ............... | 717/136 |
| 8,225,282 B1 * | 7/2012 | Massoudi et al. | ............. | 717/121 |

(Continued)

FOREIGN PATENT DOCUMENTS

WO WO2008002350 1/2008

OTHER PUBLICATIONS

Periklis Akritidis et al., Preventing memory error exploits with WIT, 2008 IEEE, [Retrieved on Sep. 11, 2012]. Retrieved from the Internet: <URL: http://ieeexplore.ieee.org/stamp/stamp.jsp?tp=&arnumber=4531158> 15 Pages (263-277).*

(Continued)

*Primary Examiner* — Don Wong
*Assistant Examiner* — Anibal Rivera
(74) *Attorney, Agent, or Firm* — Zete Law, P.L.L.C.; MacLane C. Key

(57) ABSTRACT

Methods of detecting memory errors using write integrity testing are described. In an embodiment, additional analysis is performed when a program is compiled. This analysis identifies a set of objects which can be written by each instruction in the program. Additional code is then inserted into the program so that, at runtime, the program checks before performing a write instruction that the particular object being written is one of the set of objects that it is allowed to write. The inserted code causes an exception to be raised if this check fails and allows the write to proceed if the check is successful. In a further embodiment, code may also be inserted to perform checks before indirect control-flow transfer instructions, to ensure that those instructions cannot transfer control to locations different from those intended.

16 Claims, 12 Drawing Sheets

U.S. PATENT DOCUMENTS

| | | | | |
|---|---|---|---|---|
| 2001/0049817 | A1* | 12/2001 | Kashiwagi | 717/4 |
| 2003/0110476 | A1* | 6/2003 | Aihara | 717/135 |
| 2003/0172293 | A1 | 9/2003 | Johnson et al. | |
| 2006/0130021 | A1 | 6/2006 | Plum et al. | |
| 2006/0195745 | A1 | 8/2006 | Keromytis et al. | |
| 2006/0195906 | A1* | 8/2006 | Jin et al. | 726/26 |
| 2006/0253508 | A1* | 11/2006 | Colton et al. | 707/206 |
| 2006/0277539 | A1 | 12/2006 | Amarasinghe et al. | |
| 2007/0006047 | A1* | 1/2007 | Zhou et al. | 714/38 |
| 2007/0006150 | A9* | 1/2007 | Walmsley | 717/120 |
| 2007/0006170 | A1 | 1/2007 | Hasse et al. | |
| 2007/0044075 | A1* | 2/2007 | Koning et al. | 717/122 |
| 2007/0074169 | A1 | 3/2007 | Chess et al. | |
| 2007/0074190 | A1* | 3/2007 | Verbitsky | 717/144 |
| 2007/0168968 | A1* | 7/2007 | Bates et al. | 717/124 |
| 2007/0234070 | A1* | 10/2007 | Horning et al. | 713/190 |
| 2008/0052683 | A1* | 2/2008 | Bates et al. | 717/129 |
| 2008/0098349 | A1* | 4/2008 | Lin et al. | 717/106 |
| 2008/0140968 | A1* | 6/2008 | Doshi et al. | 711/163 |
| 2009/0055799 | A1* | 2/2009 | Cao et al. | 717/111 |
| 2009/0089756 | A1* | 4/2009 | Danton et al. | 717/124 |

OTHER PUBLICATIONS

Christoph Hofer et al., Design and Implementation of a Backward-In-Time Debugger, 2006, vol. P-88, [Retrieved on Sep. 11, 2012]. Retrieved from the internet: <URL: http://hal.inria.fr/docs/00/55/57/68/PDF/Hofe06aUnstuckNode.pdf> 17 Pages (17-32).*

Abadi, et al., Control-Flow Integrity Principles, Implementations, and Applications, ACM, 2005, pp. 14.

"Beyond Stack Smashing: Recent Advances in Exploiting Buffer Overruns", IEEE Computer Society, 2004, pp. 8.

Bruschi, et al., "Static Analysis on x86 Executables for Preventing Automatic Mimicry Attacks", Springer, 2007, pp. 18.

Chen, et al., "Large-scale analysis of format string vulnerabilities in debian linux", ACM, 2007, pp. 10.

Costa,, "Vigilante: End-to-end containment of Internet worms", ACM, 2005, pp. 15.

Cowan, et al., "StackGuard: Automatic Adaptive Detection and Prevention of Buffer-Overflow Attacks", USENIX 1998, pp. 16.

Cowan, et al., "FormatGuard: Automatic Protection From printf Format String Vulnerabilities", WueX Communications, Inc., 2001, pp. 9.

Cowan, et al., "PointGuardTM: Protecting Pointers From Buffer Overflow Vulnerabilities. ", USENIX Association, 2003, pp. 15.

Dhurjati, et al., "BackwardsCompatible Array Bounds Checking for C with Very Low Overhead", ACM, 2006, pp. 10.

Heintze, et al., "Ultra-fast Aliasing Analysis using CLA: A Million Lines of C Code in a Second", ACM, 2001, pp. 254-263.

Kc. et al., "Countering CodeInjection Attacks With InstructionSet Randomization ", ACM, 2003, pp. 10.

Kiriansky, et al., "Secure Execution Via Program Shepherding", USENIX, 2002, pp. 16.

Liang, et al., "Automatic generation of buffer overflow attack signatures: an approach based on program behavior models", IEEE, 2005, pp. 10.

Nagappan, et al., "Static Analysis Tools as Early Indicators of Pre-Release Defect Density", ACM, 2005, pp. 8.

Piromsopa, et al., "Secure Bit: Transparent, Hardware Buffer-Overflow Protection", IEEE, vol. 3. No. 4, 2006, pp. 12.

Wilander, et al., "A Comparison of Publicly Available Tools for Dynamic Buffer Overflow Prevention", Network and Distributed System Security Symposium, 2003, pp. 14.

Xu, et al., "An Efficient and Backwards-Compatible Transformation to Ensure Memory Safety of C Programs", ACM, 2004, pp. 10.

Yong, et al., "Protecting C Programs from Attacks via Invalid Pointer Dereferences", ACM, 2003, pp. 10.

"Advanced Doug lea's malloc exploits," retrieved on Mar. 7, 2008 at <<http://doc.bughunter.net/buffer-overflow/advanced-malloc-exploits.html>>, 37 pages.

Andersen, "Program analysis and specialization for the C programming language," May 1994, retrieved at <<http://repository.readscheme.org/ftp/papers/topps/D-203.pdf>>, pp. 311.

Bhatkar et al., "Efficient techniques for comprehensive protection from memory error exploits," Proceedings: SSYM'05 Proceedings of the 14th conference on USENIX Security Symposium, Berkeley Ca, 2005, retrieved at <<http://seclab.cs.sunysb.edu/seclab/pubs/papers/usenix_sec05.pdf>>, pp. 17.

Castro et al., "Securing software by enforcing data-flow integrity," Proceedings: OSDI '06 Proceedings of the 7th symposium on Operating systems design and implementation, Berkeley, CA, 2006, retrieved at <<http://research.microsoft.com/~tharris/papers/2006-osdi.pdf>>, pp. 14.

Chen et al., "Non-control-data attacks are realistic threats," Proceedings: SSYM'05 Proceedings of the 14th conference on USENIX Security Symposium, Berkeley CA, 2005, retrieved at <<http://research.microsoft.com/~shuochen/papers/usenix05data_attack.pdf>>, pp. 15.

"Dangling pointer: Smashing the pointer for fun and profit," retrieved on Mar. 7, 2008 at <<http://download.watchfire.com/whitepapers/Dangling-Pointer.pdf>>, 31 pages.

Shankar et al., "Detecting Format String Vulnerabilities with Type Qualifiers," May 11, 2001, retrieved at <<http://www.cs.berkeley.edu/~daw/papers/fmtstr-use01.pdf>>, 16 pages.

Dhurjati et al., "Efficiently Detecting All Dangling Pointer Uses in Production Servers," International Conference on Dependable Systems and Networks, Philadelphia, PA, Jun. 25-28, 2006, retrieved at <<http://llvm.cs.uiuc.edu/~dhurjati/d-dsn06.pdf>>, pp. 10.

Exact link, retrieved on Mar. 7, 2008 at <<http://messenger.msn.com>>, 1 page.

"ghttpd Log() Function Buffer Overflow Vulnerability," retrieved on Mar. 7, 2008 at <<http://www.securityfocus.com/bid/5960>>, 3 pages.

Avots et al., "Improving software security with a C pointer analysis," ICSE'05, May 15-21, 2005, St. Louis, Missouri, retrieved at <<http://suif.stanford.edu/papers/icse05.pdf>>, 10 pages.

Moore et al., "Inside the Slammer Worm," Published by The IEEE Computer Society, 2003, retrieved at <<http://www.cs.ucsd.edu/~savage/papers/IEEESP03.pdf>>, 7 pages.

Jim et al., "Cyclone: A safe dialect of C," Proceedings: USENIX Annual Technical Conference, Monterey, CA, Jun. 13-15, 2002, retrieved at <<http://www.cs.cornell.edu/projects/cyclone/papers/cyclone-safety.pdf>>, pp. 14.

Jones et al., "Backwards-compatible bounds checking for arrays and pointers in c programs," May 1997, retrieved at <<http://citeseer.ist.psu.edu/cache/papers/cs/27115/http:zSzzSzwww.doc.ic.ac.ukzSz~phjkzSzPublicationszSzBoundsCheckingTalk.pdf/jones97backwardscompatible>>, pp. 29.

Larochelle et al., "Statically Detecting Likely Buffer Overflow Vulnerabilities," Proceedings: SSYM'01 Proceedings of the 10th conference on USENIX Security Symposium, Berkeley CA, 2001, retrieved at <<http://lclint.cs.virginia.edu/usenix01.pdf>>, pp. 13.

Necula et al., "CCured: Type-Safe Retrofitting of Legacy Software," Journal ACM Transactions on Programming Languages and Systems (TOPLAS) vol. 27 Issue 3, New York, NY, May 2005, retrieved at <<http://www.cs.berkeley.edu/~smcpeak/papers/ccured_toplas.pdf>>, p. 48.

Newsome et al., "Dynamic Taint Analysis for Automatic Detection, Analysis,and Signature Generation of Exploits on Commodity Software," May 2004, Last updated Jul. 2005, retrieved at <<http://valgrind.org/docs/newsome2005.pdf>>, pp. 17.

"Null HTTPd Remote Heap Overflow Vulnerability," retrieved on Mar. 7, 2008 at <<http://www.securityfocus.com/bid/5774>>, 1 page.

"Olden: Parallelizing Programs with Dynamic Data Structures on Distributed-Memory Machines," Jun. 1998, retrieved at <<http://www.usafa.af.mil/df/dfcs/papers/Carlisle/Publications/research/mcc/dissertation.html>>, 1 page.

"Phoenix Framework," retrieved on Jan. 14, 2008 at <<http://research.microsoft.com/phoenix/phoenixrdk.aspx>>, 1 page.

"Portable Network Graphics (PNG) Specification and Extensions," retrieved on Mar. 7, 2008 at <<http://www.libpng.org/pub/png/spec/>>, 2 pages.

Robertson et al., "Run-time Detection of Heap-based Overflows," In LISA '03: Proceedings of the 17th Large Installation Systems Administration Conference, 2003, retrieved at <<http://www.cs.ucsb.edu/~wkr/publications/lisa2003heappresentation.pdf>>, pp. 39.

Ruwase et al., "A Practical Dynamic Buffer Overflow Detector," In Proceedings of the 11th Annual Network and Distributed System Security Symposium, Feb. 2004, retrieved at <<http://suif.stanford.edu/papers/tunji04.pdf>, pp. 11.

"Smashing the Stack for Fun and Profit," Phrack magazine, 1996, retrieved on Jul. 3, 2008 at <<http://www.phrack.org/issues.html?issue=49&id=14>>, 29 pages.

Smirnov et al., "DIRA: Automatic Detection, Identification, and Repair of Control-Hijacking Attacks," In NDSS, Feb. 2005, retrieved at <<http://www.isoc.org/isoc/conferences/ndss/05/proceedings/papers/dira.pdf>>, pp. 17.

"Standard Performance Evaluation Corporation," The SPEC Organization, retrieved on Mar. 7, 2008 at <<http://www.spec.org>>, 4 pages.

"STunnel Client Negotiation Protocol Format String Vulnerability," retrieved on Mar. 7, 2008 at <<http://www.securityfocus.com/bid/3748>>, 1 page.

Wagner et al., "A First Step Towards Automated Detection of Buffer Overrun Vulnerabilities," 2000, retrieved at <<http://www.cs.berkeley.edu/~daw/papers/overruns-ndss00.pdf>>, 15 pages.

Xu et al., "Taint-Enhanced Policy Enforcement: A Practical Approach to Defeat a Wide Range of Attacks," 15th USENIX Security Symposium, 2006, retrieved at <<http://seclab.cs.sunysb.edu/seclab/pubs/papers/usenix_sec06.pdf>>, pp. 18.

Yong et al., "Pointer-Range Analysis," SpringerLink, Lecutre Notes in Computer Science, 2004, vol. 3148/2004, retrieved at <<http://citeseer.ist.psu.edu/cache/papers/cs2/491/http:zSzzSzwww.cs.wisc.eduzSzwpiszSzpaperszSzsas04.suan.pdf/yong04pointerrange.pdf>>, 16 pages.

* cited by examiner

US 8,434,064 B2

DETECTING MEMORY ERRORS USING WRITE INTEGRITY TESTING

BACKGROUND

Attacks on software often exploit memory errors, such as buffer overflows, to crash programs or to gain control over the execution of a program. This is a serious problem because a large proportion of software vulnerabilities are memory errors. Techniques have been developed to protect against such attacks, however despite this at least 40% of the vulnerabilities published by US Computer Emergency Readiness Team (US-CERT) in the last six months are memory errors.

Safe languages (e.g. Java and C#) include checks to ensure type safety and they throw exceptions when the checks fail; however unsafe languages (e.g. C and C++) are particularly vulnerable. Checks can be added transparently to programs written in unsafe languages; however, existing techniques are impractical because they have high overhead or require non-trivial changes to the source code or the language runtime.

The embodiments described below are not limited to implementations which solve any or all of the disadvantages of known methods of detecting errors and preventing attacks.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of detecting memory errors using write integrity testing are described. In an embodiment, additional analysis is performed when a program is compiled. This analysis identifies a set of objects which can be written by each instruction in the program. Additional code is then inserted into the program so that, at runtime, the program checks before performing a write instruction that the particular object being written is one of the set of objects that it is allowed to write. The inserted code causes an exception to be raised if this check fails and allows the write to proceed if the check is successful. In a further embodiment, code may also be inserted to perform checks before indirect control-flow transfer instructions, to ensure that those instructions cannot transfer control to locations different from those intended.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
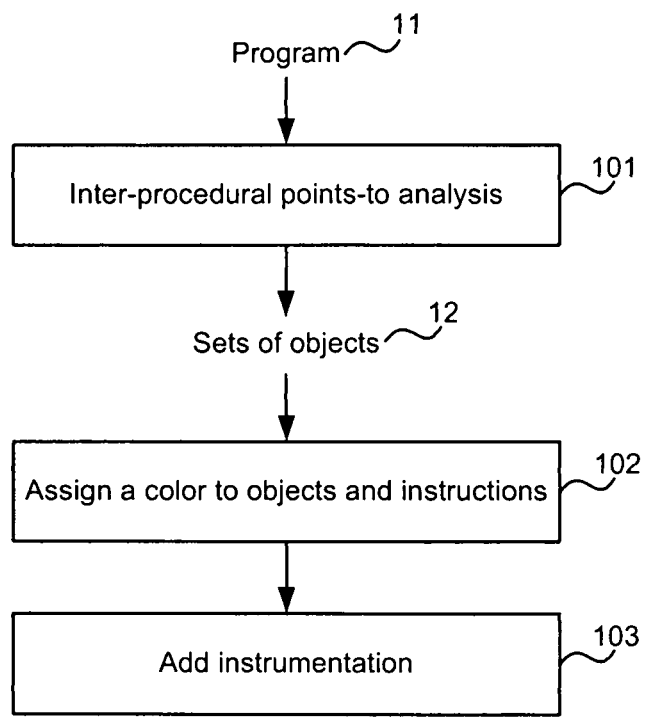
FIG. 1 is a flow diagram of an example method of preventing memory error exploits.

FIG. 1 is a flow diagram of an example method of preventing memory error exploits. The method (and all variations described herein), which is referred to herein as 'Write Integrity Testing' (WIT), can be applied to programs written in unsafe languages such as C and C++ without modifications and does not require changes in language runtime. Write integrity testing may also be applied to other languages, including high level languages and low level languages.

Inter-procedural points-to analysis (block 101) is used to generate a set of objects that can be written by each instruction in the program 11 being analyzed. The sets of objects 12 output by the points-to analysis are used to assign a color to each object and instruction in the program 11 (block 102). Each object is assigned a single color and the set of objects that can be written by an instruction have the same color. Therefore each instruction has a single color that it is allowed to write. Instrumentation (i.e. instructions) is then added to the program to cause the program to maintain a color table and check writes (block 103). The color table which is maintained at runtime records the color of each memory location. The write checks which are instrumented (in block 103) comprise looking up the color of the memory location being written, which is stored in the color table, and checking if this color is equal to the color that the instruction is allowed to write.

Figure 2:
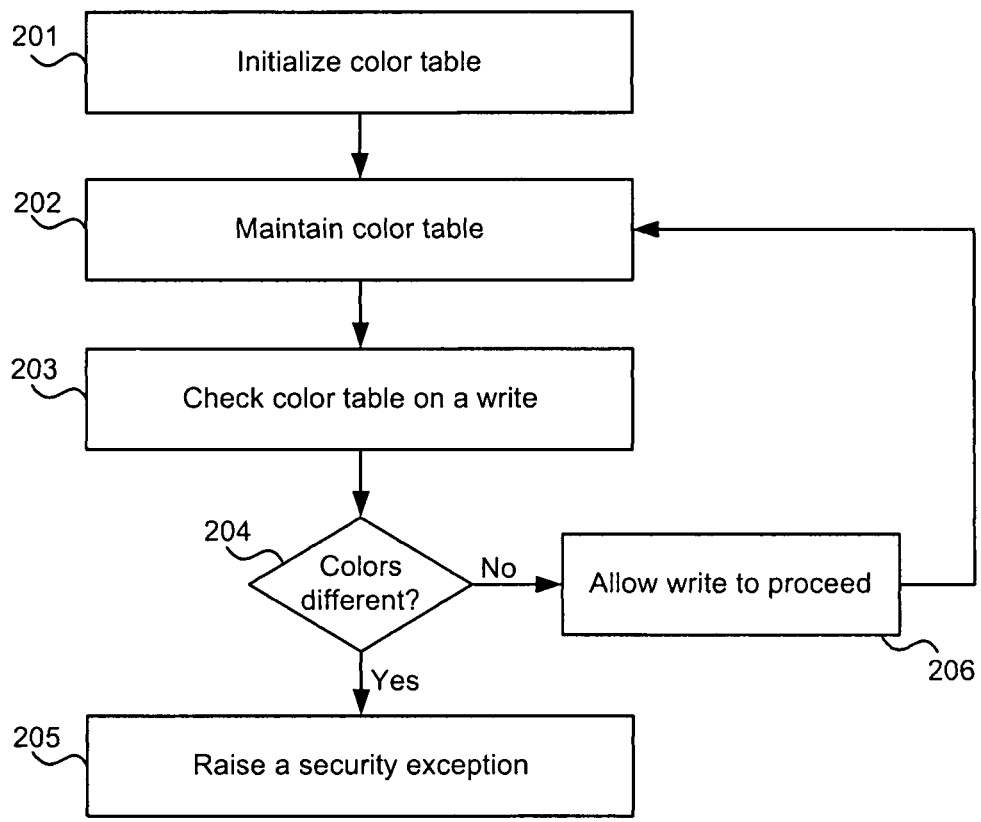
FIG. 2 is a flow diagram of an example method of operation of a runtime component for preventing memory error exploits.

The method shown in FIG. 1 comprises a compile-time component. WIT also comprises a runtime component, as shown in FIG. 2, in which the additional instructions which were added to the program at compile-time (in block 103) are performed. At runtime, the color table is initialized (block 201) and subsequently maintained (block 202), e.g. when objects are allocated and deallocated. On a write, the color table is checked (block 203) to compare the color of the memory location being written and the color that the instruction is allowed to write, which is known statically. If the colors are different ('Yes' in block 204), a security exception is raised (block 205).

This method can be illustrated using the following example which is a simplified Web server with a buffer overflow vulnerability.

```
1: char cgiCommand[1024];
2: char cgiDir[1024];
3:
4: void ProcessCGIRequest(char* message, int size) {
5:     int i=0;
6:     while (i < size) {
7:         cgiCommand[i] = message[i];
8:         i++;
9:     }
10:
11:    ExecuteCGIRequest(cgiDir, cgiCommand);
12: }
```

When the Web server in the example above receives a CGI command, it calls ProcessCGIRequest with the message it received from the network and its size as arguments. The function copies the command from the message to the global variable cgiCommand and then calls ExecuteCGIRequest to execute the command. The variable cgiDir contains the pathname of the directory with the executables that can be invoked by CGI commands. ExecuteCGIRequest first checks that cgiCommand does not contain the substring "\\.." and then it concatenates cgiDir and cgiCommand to obtain the pathname of the executable to run.

The buffer overflow vulnerability is located in lines 5-9: if the message is too long, the attacker can overwrite cgiDir. This allows the attacker to run any executable (for example, a command shell) with the arguments supplied in the request message. This is a non-control-data attack: it does not violate control-flow integrity.

WIT starts by using points-to analysis (block 101) to compute the set of objects that can be modified by each instruction, which is referred to herein as the 'mod set' for each instruction. For the example above, the analysis computes the mod set {i} for the instructions at lines 5 and 8, and the mod set {cgiCommand} for the instruction at line 7.

Colors are then assigned to each object and instruction (block 102). Variable 'i' is assigned a color and instructions 5 and 8 are assigned the same color (e.g. color 4). A different color is assigned to variable 'cgiCommand' and instruction 7 (e.g. color 3). Different colors are also assigned to each of variables 'message', 'size' and 'cgiDir'. This therefore results in the allocation of five different colors. Instrumentation is then added at the beginning of main (in block 103) to set the color of storage locations occupied by each of the global variables. Write checks are also added before instructions 5, 7 and 8 to check if the location being written has the correct color, i.e. color 3 for instruction 7 and color 4 for instructions 5 and 8, in this example.

Figure 3:
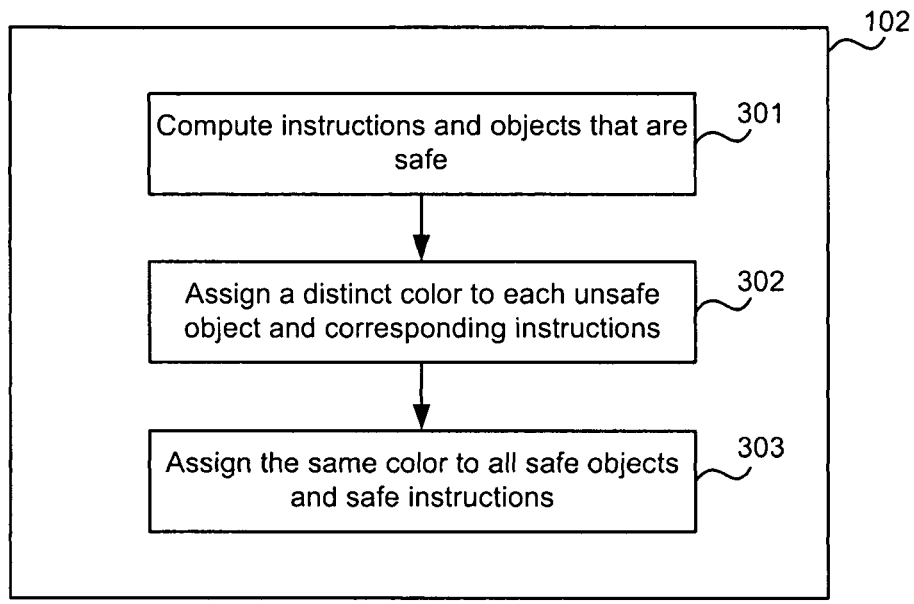
FIG. 3 shows an example implementation of method block from FIG. 1 in more detail.

To reduce space and time overhead at runtime, write safety analysis may also be performed, as shown in FIG. 3. An instruction is safe if it cannot violate write integrity (i.e. if it cannot result in a write out of bounds or otherwise violate memory safety) and an object is safe if all instructions that can modify the object (according to the points-to analysis) are safe. FIG. 3 shows an example implementation of method block 102 in more detail in which write safety analysis is performed to compute instructions and objects that are safe (block 301). In the example above, the write safety analysis determines that instructions 5 and 8 are safe because they can only modify 'i' and, therefore, 'i' is safe. It also determines that the arguments to ProcessCGIRequest are safe. In contrast, instruction 7 is not safe because it may modify objects other than cgiCommand depending on the value of 'i'.

The results of the points-to and write safety analysis (in blocks 101 and 301) are used to assign a color to each instruction and a color to each logical object in the program. Distinct colors are assigned to each unsafe object under the constraint that each object has a unique color and all the objects in the mod set of an instruction have the same color (block 302). The same color, (e.g. color 0), is assigned to all safe objects and all safe instructions (block 303). The color assignment may be done manually or automatically (e.g. as described below).

The use of write safety analysis in this way reduces the number of bits required to represent colors, as can be shown with reference to the example above. Variables 'message', 'size', and 'i' and instructions 5 and 8 are assigned color 0 because they are safe. Color 3 is assigned to variable 'cgiCommand' and instruction 7, and color 4 is assigned to variable 'cgiDir'. This reduces the number of colors assigned in this example from five to three (colors 0, 3 and 4).

As described above, the checks on writes compare the color of the instruction performing the write to the color of the storage location being written (as shown in FIG. 2). If the colors are different, they raise a security exception (block 205). The color of each instruction is known statically (i.e. they are embedded in the instrumented code) and write checks use the color table to lookup the color of the location being written. Where write safety analysis is used (as shown in FIG. 3), write checks may be omitted (i.e. not added in block 103) for safe instructions, which improves performance. In the example above, WIT may therefore add write checks only before instruction 7 to check if the location being written has color 3. Write checks before lines 5 and 8 can be omitted because these instructions are safe.

Figure 5:
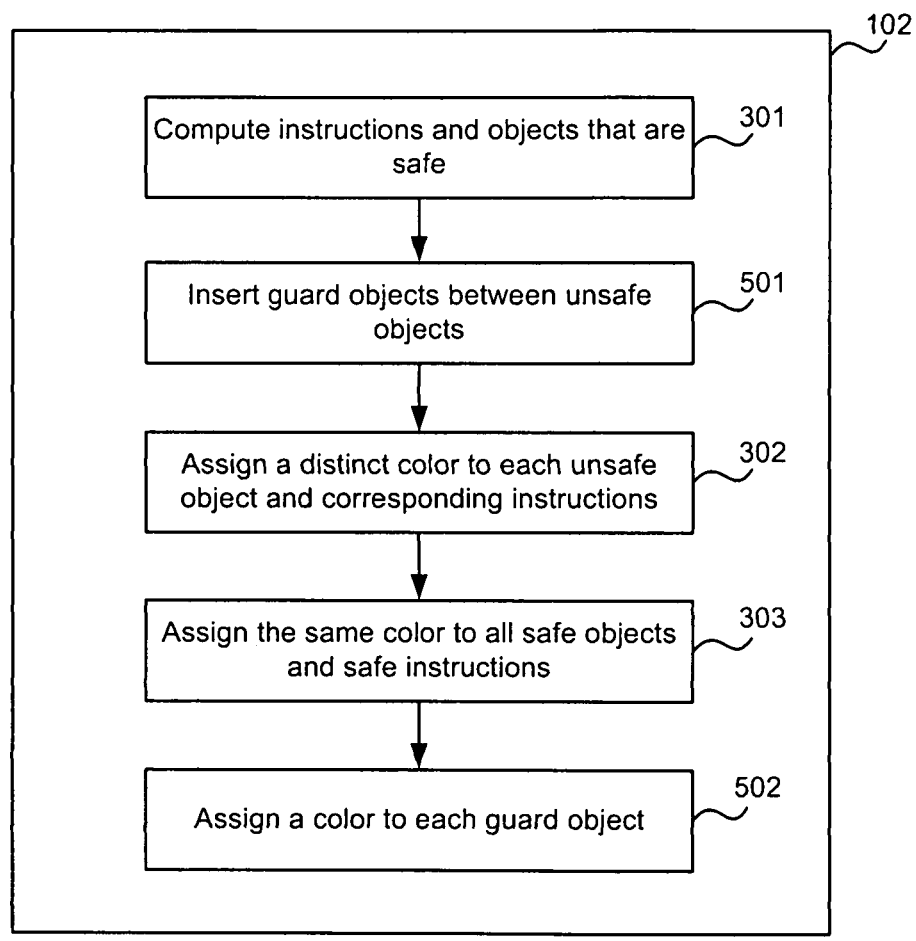
FIG. 5 shows another example implementation of method block from FIG. 1 in more detail.

To reduce the false negative rate due to imprecision of the points-to analysis, small guard objects may be added between the original objects in the program that are not safe (as shown in block 501 of FIG. 5). One or more colors may be reserved for guard objects. For example, Color 1 may be reserved for guard objects on one memory heap, color 2 for guard objects on another memory heap, and color 0 for guard objects on the stack and global data sections (as assigned in block 502 of FIG. 5). If the colors for guard objects are not assigned to the original objects and instructions in the program, this ensures that instructions in the original program cannot modify guard objects. Guard objects may be eight bytes long. In the example above, the code may be instrumented (in block 103) to add guard objects just before cgiCommand, between cgiCommand and cgiDir, and just after cgiDir. Guard objects need not be inserted around the arguments to ProcessCGIRequest and local variable 'i' because they are safe.

WIT uses the color table to record the color of each memory location. When an object is allocated, the instrumentation sets the color of the storage locations occupied by the object to the object's color. In the example above, WIT adds instrumentation (in block 103) at the beginning of main to set the color of the storage locations occupied by cgiCommand to 3, the color of the storage for cgiDir to 4, and the color of the storage for the guard objects around them to 1.

An optimization may be used to reduce the cost of updating the color table. The color table may be initialized (in block 201) to zero for all memory locations and the color table then does not need to be updated (in block 202) when safe objects are allocated on the stack. Instead, only the colors for locations corresponding to guard objects and unsafe objects are updated on function entry. On function exit, the color table entries that were updated on function entry are reset to zero. Therefore, this optimization changes the instrumentation which is added at compile-time (in block 103) and in the example above, there is no instrumentation required to update the color table on function entry or exit for ProcessCGIRequest.

Figure 4:
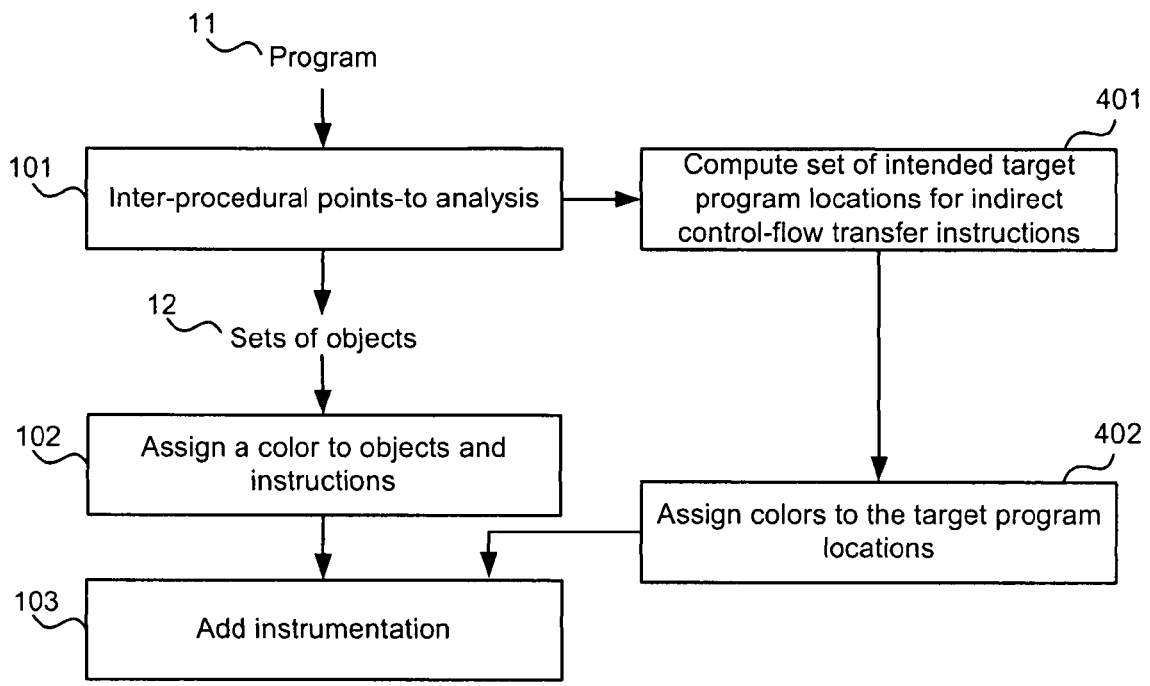
FIG. 4 is a flow diagram of another example method of preventing memory error exploits.

FIG. 4 is a flow diagram of another example method of preventing memory error exploits. In addition to assigning colors to objects and instructions (in block 102) and adding instrumentation to maintain a color table, check writes and in some cases also to add guard objects (in block 103), additional instrumentation is added (in block 103) to enforce control-flow integrity, i.e. that control-flow transfer instructions always transfer control to the intended program locations. For example, that an indirect call instruction always calls one of the functions that the programmer intended to call.

The results of the points-to analysis (in block 101) are used to compute the set of intended target program locations for indirect control-flow transfer instructions (block 401). This is the set of program locations in the points-to set of the pointer argument to each indirect control-flow transfer instruction. Colors are assigned to the target program locations (in block 402) such that program locations that are targets of the same indirect control-flow transfer instructions have the same color. This assignment (in block 402) may be independent of the one used for write checking (in block 102).

In an example implementation, the method may compute the set of functions that can be called by each indirect call instruction in the program (in block 401), where an indirect call instruction is an example of an indirect control-flow transfer instruction. This set which is computed is the set of functions in the points-to set of the pointer argument to each indirect call instruction. Colors are then assigned to the entry point of each function that can be called indirectly (in block 402) such that entry points of functions that can be called by the same instruction have the same color.

Figure 6:
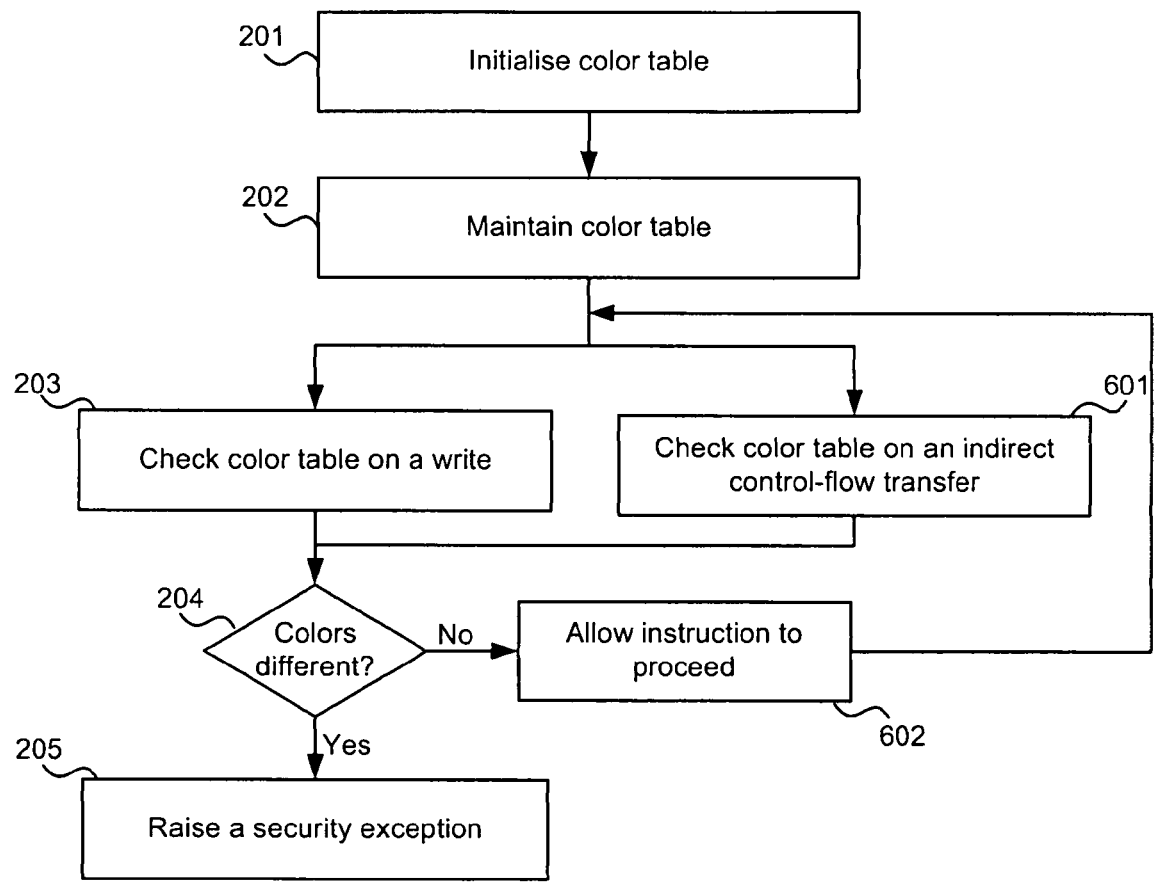
FIG. 6 is a flow diagram of another example method of operation of a runtime component.

FIG. 6 is a flow diagram of another example method of operation of a runtime component. The color of each program location that is the target of an indirect control-flow transfer (e.g., a function) is recorded in the color table at program start-up time (in block 201), and, in addition to checking the color table on writes (in block 203), the color table is also checked on indirect control-flow transfers (e.g. on indirect function calls) (block 601). In either situation, if the colors are different (as determined in block 204), a security exception is raised (block 205), and if the colors are the same (as determined in block 204), the instruction is allowed to proceed (block 602).

Whilst there are no indirect control-flow transfer checks in the example above, many attacks violate control-flow integrity and WIT can prevent them. Furthermore, enforcing control-flow integrity may prevent an attacker from bypassing the write checks.

The instrumentation added in the methods described above (in block 103) can prevent attacks that exploit memory errors and it is suitable for use in production systems because it has very low overhead. In the example Web server, the write check before line 7 fails and raises an exception if an attacker attempts to overflow cgiCommand. For example, when 'i' is 1024, the color of the location being written is 1 (which is the color of the guard objects) rather than 3 (which is the color of cgiCommand). If, instead, guard objects are not used, the methods described above would still be able to detect this attack because the colors of cgiCommand and cgiDir are different.

WIT can prevent attacks that violate write integrity or control-flow integrity, as described above. The number of attacks that violate these properties depends on the precision of the points-to analysis. However, many attacks may be prevented regardless of the precision of the points-to analysis. For example, WIT is able to prevent: attacks that exploit buffer overflows and underflows by writing elements sequentially (which are the most common); attacks that overwrite any safe object (which include return addresses, exception handlers, and data structures for dynamic linking); and attacks that corrupt heap management data structures. Since the points-to analysis can compute the call graph accurately, WIT can effectively prevent control-data attacks. There are also other attacks which may be prevented using the methods described herein.

The following description provides further detailed examples of aspects of the methods described above. It will be appreciated that the above description included a number of different optimizations (e.g. write safety analysis, guard objects and checking of indirect calls) and none or any one or more of these optimizations may be implemented.

The points-to and the write safety analysis may be implemented using the Phoenix compiler framework (as described at http://research.microsoft.com/phoenix/phoenixrdk.aspx). In such an implementation, the analysis may operate on Phoenix's medium level intermediate representation (MIR), which enables it to be applied to different languages. The MIR for the vulnerable C code example given above is:

|   |   |   |   |
|---|---|---|---|
|   | _i | = ASSIGN 0 | #1 |
| $L6: | t273 | = COMPARE(LT) _i, _size | #2 |
|   |   | CONDITIONALBRANCH(True) t273, $L8, $L7 | #3 |
| $L8: | t278 | = ADD _message, _i | #4 |
|   | t276 | = ADD &_cgiCommand, _i | #5 |
|   | [t276] | = ASSIGN [t278] | #6 |
|   | _i | = ADD _i, 1 | #7 |
|   |   | = GOTO $L6 | #8 |
| $L7 |   | = CALL &_ExecuteCGIRequest, &_cgiDir, &_cgiCommand | #9 |

An inter-procedural points-to analysis technique, such as described in 'Program analysis and specialization for the C programming language' by L. Andersen (PhD thesis, University of Copenhagen, 1994). This technique is flow and context insensitive but scales to large programs. It computes a points-to set for each pointer, which is the set of logical objects the pointer may refer to. The analysis using this technique is conservative: it includes all objects that the pointer may refer to at runtime but it may include additional objects.

The points-to analysis makes a global pass over all source files to collect subset constraints. For example, each assignment x=y results in a subset constraint x ⊃ y, which means that the set of possible values of x contains the set of possible values of y. Phoenix may be used to compile each source file to MIR and write all subset constraints in the MIR to a file. After this global pass, the analysis reads the constraints file and computes the points-to sets by iterating over all the constraints until it reaches a fixed point. Then, it stores the points-to sets in a file.

The write safety analysis classifies instructions as safe or unsafe: an instruction is marked safe if it cannot violate write integrity. The analysis marks safe all MIR instructions without an explicit destination operand or whose destination operand is a temporary, a local variable, or a global. These instructions are safe because they either modify registers or they modify a constant number of bytes starting at a constant offset from the frame pointer or the data segment. Assuming the compiler is correct (because these constants are generated by the compiler), the analysis does not introduce false negatives because the attacker cannot violate control-flow integrity. In the example above, all instructions are safe except instruction #6.

Figure 7:
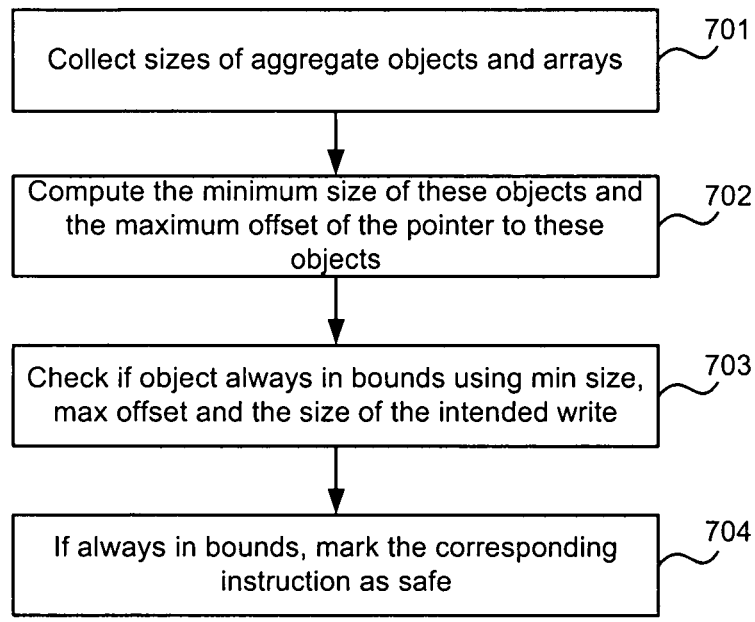
FIG. 7 is a flow diagram of an example method of computing writes which are safe.

In addition, the write safety analysis may run a simple intra-procedural pointer-range analysis to compute writes through pointers that are always in bounds. The instructions that perform these writes are marked safe. In an example, as shown in FIG. 7, the pointer-range analysis collects sizes of aggregate objects (e.g. structs) and arrays that are known statically (block 701) and then uses symbolic execution to compute the minimum size of the objects each pointer can refer to and the maximum offset of the pointer into these objects (block 702). When the analysis cannot compute this information or the offset can be negative, it conservatively assumes a minimum size of zero. Given information about the minimum sizes, the maximum offsets, and the size of the intended write, the analysis checks if writes through the pointer are always in bounds (block 703). If they are, the corresponding instruction is marked safe (block 704).

While making the global pass over all source files to collect constraints for the points-to analysis, the write safety analysis may also be run and the destination operands of unsafe instructions collected and written to a file.

Figure 8:
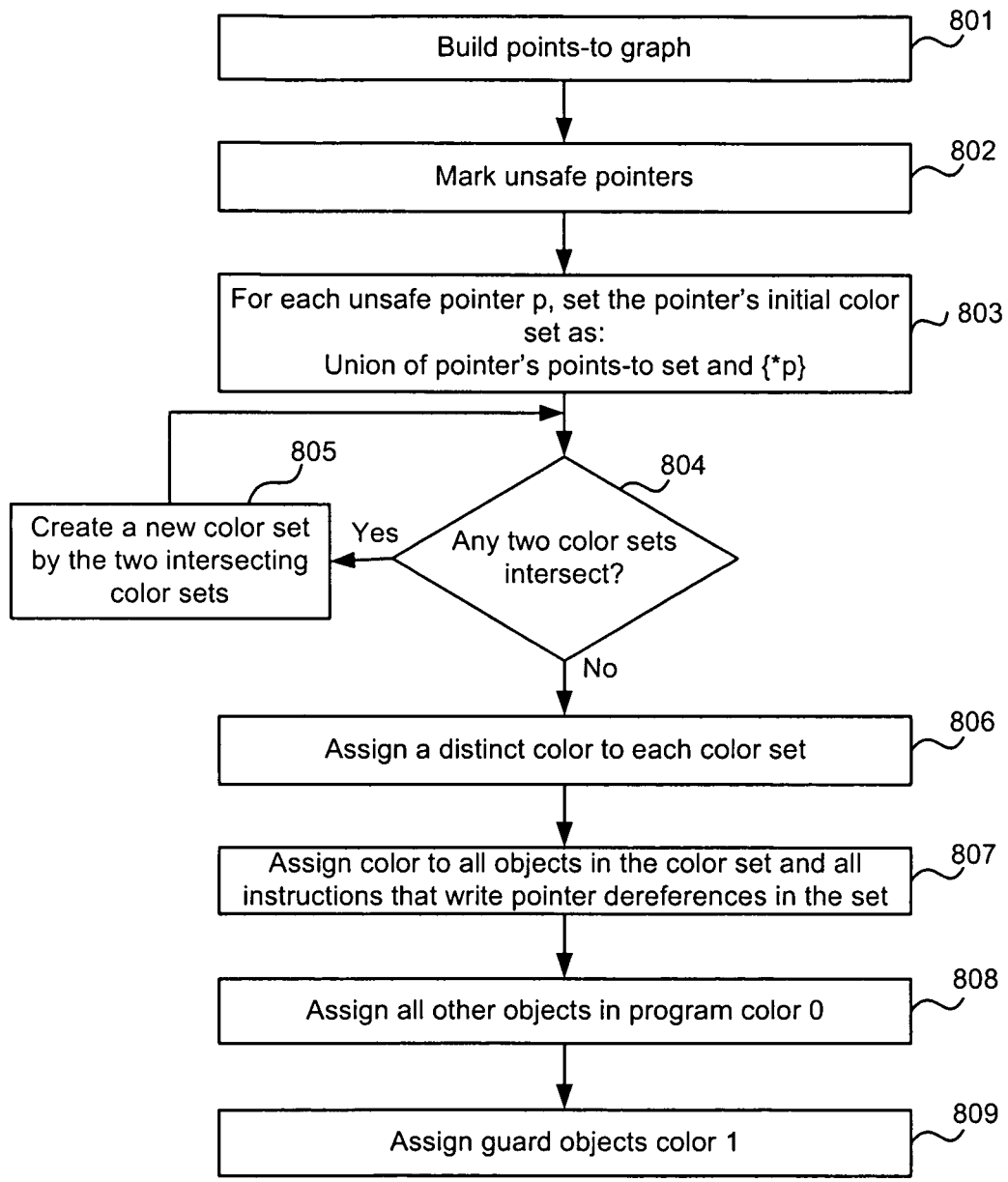
FIG. 8 is a flow diagram of a further example method of preventing memory error exploits.

The results of the points-to and write safety analysis are used to assign colors to objects and instructions, as shown in FIG. 8. The points-to graph is built (block 801) and the pointers in the graph that are dereferenced for writing by unsafe instructions are marked as unsafe (block 802). A pointer is an operand for an instruction, e.g. an instruction may write a value to the object pointed-to by a pointer (the pointer and the value are the operands of the instruction). The constraints in the annotated graph are then used to compute color sets, which include objects and unsafe pointer dereferences that are assigned the same color because they may alias each other.

To compute color sets, each unsafe pointer p is selected and its initial color set is set to the union of p's points-to set and the singleton containing the pointer dereference {*p}, where *p denotes the object pointed to by p, (block 803). The method then iterates over the color sets. If a color set s intersects with another color set t (as determined in block 804), the two color sets are merged into a new color set that replaces s and t (block 805). When all remaining color sets are disjoint ('No' in block 804), the process stops and a distinct color is assigned to each color set (block 806) and this color is assigned to all objects in the color set and all instructions that write pointer dereferences in the set (block 807). All the other objects in the original program are assigned color zero (block 808) and guard objects are assigned color one (block 809).

The method shown in FIG. 8 only considers points-to sets of unsafe pointers when computing colors. This reduces the false negative rate and the overhead to maintain the color table. However, other example implementations may consider all points-to sets and pointers (e.g. in block 803). Whilst FIG. 8 shows use of color zero for safe objects and color one for guard objects, these colors are used by way of example only and it will be appreciated that other colors may be used for these two types of objects. Furthermore, in some implementations, more than one color may be used for the guard objects or guard objects may not be used.

A similar algorithm to that shown in FIG. 8 may be used to assign colors to functions that may be called indirectly or other indirect control-flow transfer instructions. The differences are that this version of the algorithm iterates over the points-to sets of pointers that are used in indirect call instructions (or other indirect control-flow transfer instructions), and that it may (in some examples) only consider the objects in these sets that are functions. The colors assigned to function code may be independent of the colors assigned to data. Colors may be assigned to data objects under the assumption that the relative layout of independent objects in memory is undefined.

It may also be assumed that correct programs do not use pointer arithmetic to navigate between independent objects in memory. For example in the MIR example above, the analysis assumes that correct programs will not use t276, which is a pointer into the cgiCommand array, to write to cgiDir. Existing compilers already make this assumption when implementing several standard optimizations. Therefore, this assumption applies to the vast majority of programs. If this assumption is violated, this is detected using the methods described herein.

The following paragraphs describe an example implementation of the instrumentation in more detail. In an example, several Phoenix plugins may be used to generate the instrumentation.

The color table maps memory addresses to colors and write checks and indirect call checks lookup the color table before allowing unsafe writes and indirect calls. When an object is allocated, the instrumentation sets the color of the memory addresses occupied by the object to the object's color. To achieve low space and time overhead, the color table may be compact and enable efficient lookups and updates.

To keep the color table small, one byte in the color table (referred to as a 'color byte') may represent a portion of memory for the instrumented program. In such an implementation, objects with different colors cannot be mapped to the same byte in the color table, i.e. they cannot both be allocated in a portion of memory that corresponds to a byte in the color table. The program may be instrumented (e.g. in block 103) to add code which, when allocating objects, ensures that no two objects with different colors share a portion of memory corresponding to one byte in the color table.

In an example implementation, the virtual memory of the instrumented program may be divided into aligned eight-byte slots. The color table is implemented as an array with an eight-bit color identifier for each of these slots. Therefore, it introduces a space overhead of only 12.5%. A single color is recorded for each eight-byte slot and this is enabled by generating code such that no two objects with distinct colors ever share the same slot. This requirement is easily enforced for heap objects because they are eight-byte aligned and for functions because they are 16-byte aligned. However, the stack and data sections are only four-byte aligned in 32-bit x86 architectures. Whilst it is possible to force eight byte alignment of objects in these sections, this introduces a runtime overhead. Instead, unsafe objects and guard objects in the stack and data sections are forced to be four-byte aligned and a four-byte aligned pad is inserted after unsafe objects. For an unsafe object of size s, the pad is eight-bytes long if ⌈s/4⌉ is even and four-bytes long if ⌈s/4⌉ is odd. ⌈s/8⌉ color table entries are set to the color of the unsafe object when the pad is four-bytes long and |s/8|+1 color table entries are set to the color of the unsafe object when the pad is eight-bytes long. This introduces a space overhead due to padding; however this will be reduced in 64-bit x86 architectures because the stack and data sections are eight-byte aligned in these architectures.

Figure 9:
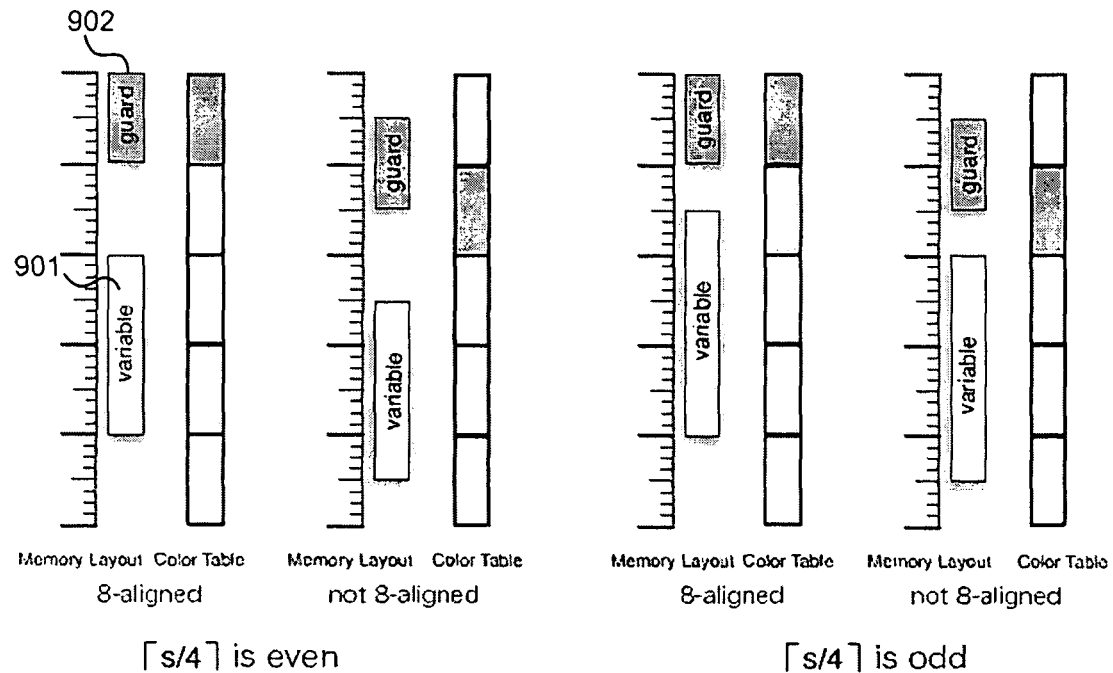
FIG. 9 is a schematic diagram showing padding of objects in memory.

FIG. 9 shows how padding works, with the lowest addresses being shown at the bottom. Depending on the alignment at runtime, the color of a pad (i.e. the space between the unsafe object 901 and guard object 902) is set to the color of the unsafe object 901, the guard object 902, or both. None of these configurations introduces errors because the pads and guard objects should not be accessed by correct programs and the storage locations occupied by unsafe objects are always colored correctly. Conceptually, the pads allow the guard objects to "move" to ensure that they do not share a slot with the unsafe objects.

Since the points-to analysis does not distinguish between different fields in objects and between different elements in arrays, the same color is assigned to all the elements of an array and to all the fields of an object. Therefore, it is not necessary to change the layout of arrays and objects and this provides backwards compatibility.

Use of write safety analysis is very effective at reducing the number of objects that colors are assigned to and as a result in many examples, only eight bits are required to represent colors. However, in some examples more bits will be required to represent colors (e.g. in very large programs). In such a situation, the size of color table entries may be increased to 16-bits and the memory slot sizes may also be increased to 16-bytes, or 8-bit color identifiers may be used at the expense of worse coverage. As functions are already 16-byte aligned, 16 bits may be used to represent the colors of functions without any modifications. In other implementations a different slot size may be used and a different number of bits may be used to represent colors.

The color table can be accessed efficiently. Since there are 2 GB of virtual address space available for the user in Windows XP and Windows Vista, 256 MB of virtual address space may be allocated for the color table. In an example implementation, the base of the color table is at address 40000000h and so to compute the address of the color table entry for a storage location, the address of the storage location is taken, shifted it right by three (to divide by eight, as there is 1 byte of color data for 8 bytes of memory), and 40000000h is added. In other examples, the base of the color table may be mapped elsewhere, e.g. at 0 (which means that it is not necessary to add 40000000h when computing the address of the color table entry). It will be appreciated that the methods are also applicable to other operating systems.

To protect the color table from being overwritten by an attacker, the pages in the table that contain the entries for the virtual address range occupied by the table itself may be read-protected. In an example, with the base of the table at 40000000h, the pages in the address range 48000000h to 4A000000h may be protected to prevent reads and writes. Since checks are added before unsafe writes and control-flow integrity ensures that the attacker cannot bypass these checks, the attacker cannot overwrite the color table because the write check would trigger a read fault on the protected address range.

As described above, in some examples, only the writes performed by unsafe instructions are checked. These checks lookup the color of the destination operand in the color table. Then they compare this color with the color of the instruction. If the colors are the same, they allow the write to proceed and otherwise, they generate an exception (as shown in FIG. 2).

In an example implementation, the instrumentation to check writes is generated in two phases. First, a new MIR instruction CHECKWRITE is inserted that takes as arguments the color of the unsafe instruction and the address of its destination operand. In this example, CHECKWRITE is inserted at MIR because the static analysis works at the MIR level. For example, the following instrumentation would be added before the unsafe instruction in the MIR example above:

```
         CHECKWRITE 3, &[t276]          # write check
[t276] = ASSIGN [t278]                  # unsafe instruction
```

The CHECKWRITE instruction is lowered into x86 assembly which generates the following assembly code sequence:

```
     lea   edx,[ecx]                ; 2 bytes
     shr   edx,3                    ; 3 bytes
     cmp   byte ptr [edx+40000000h],3 ; 7 bytes
     je    out                      ; 2 bytes
     int   3                        ; 1 byte
out: mov   byte ptr [ecx],ebx       ; unsafe store
```

This code sequence loads the address of the destination operand (3) into a register (register ecx), and shifts the register right by three to obtain the operand's index in the color table. Then it compares the color in the table with the color of the unsafe instruction. If they are different, it executes int 3. This raises an exception that invokes the debugger in debugging runs, or terminates execution in production runs. Alternatively, a different exception could be raised.

In another alternative implementation, the sequence of instructions is inserted in the MIR and the compiler lowers each individual instruction in the sequence. For the example above, the following sequence could be inserted in the MIR before the unsafe write:

```
t300 = SHIFTRIGHT &[t276], 3
t301 = COMPARE(EQ) [t300+40000000h], 3
CONDITIONALBRANCH(True) t301, $L11, $L10
$L10: BREAK
$L11: [t276] = ASSIGN [t278] # unsafe write
```

The compiler would lower this sequence to a sequence of x86 instructions similar to the one described above. This implementation makes the write instrumentation independent of the target architecture.

The instruction 'free' may be treated as an unsafe instruction that writes to the object pointed to by its argument. A write check may be inserted before free to ensure that its argument points to an object with the right color, that the slot before this object has the color of heap guard objects, that the pointer being freed is 8-byte aligned, and that it points into user address space. Since the color of heap objects are reset (e.g. to one) when they are freed, this prevents several memory errors that corrupt heap management data structures, for example, double frees (i.e. a memory location cannot be freed more than once without an intervening allocation) and frees whose argument is a pointer into the middle of an allocated object.

As described above, checks may also be added before each indirect call. In an example implementation, a new MIR instruction CHECKICALL is inserted that takes as arguments the color of allowed call targets and the function pointer. For example, WIT adds the instrumentation in the first line before the indirect call in the second line:

```
CHECKICALL 20, t280     # indirect call check
CALL t280               # indirect call
```

The CHECKICALL instruction is lowered into a sequence of x86 instructions, as follows:

```
        shr     edx,3                   ; 3 bytes
        cmp     byte ptr [edx+40000000h],20   ; 7 bytes
        je      out                     ; 2 bytes
        int     3                       ; 1 bytes
out:    shl     edx, 3                  ; 3 byte
        call    edx                     ; indirect call
```

The first instruction shifts the function pointer right by three to compute the color table index of the first instruction in the target function. The cmp instruction checks if the color in the table is the color of allowed targets for this indirect call instruction. If they are different, WIT raises an exception. If they are equal, the index is shifted left by three to restore the original function pointer value and the function is called. This instruction sequence zeroes the three least significant bits of the function pointer value. Since the first instruction in a function is always 16-byte aligned, this has no effect if the function pointer value is correct; however it prevents attacks that cause a control flow transfer into the middle of the first eight-byte slot of an allowed target function. Therefore, this instruction sequence ensures that the indirect call transfers control to the first instruction of a call target that is allowed by the static analysis. The checks on indirect calls are sufficient to enforce control-flow integrity because all other control data is protected by the write checks.

In another alternative implementation, the sequence of instructions is inserted in the MIR and the compiler lowers each individual instruction in the sequence. For the example above, we could replace the call t280 by

```
        t300 = SHIFTRIGHT t280, 3
        t301 = COMPARE(EQ) [t200+40000000h], 20
        CONDITIONALBRANCH(True) t301, $L10, $L11
$L11:   BREAK
$L10:   t302 = SHIFTLEFT t300, 3
        CALL t302       # indirect call
```

This sequence can be lowered to a sequence of x86 instructions similar to the one described above. This implementation makes indirect call instrumentation independent of the target architecture.

As described above, small guard objects may be added before and after unsafe objects in the vulnerable program. This improves WIT's coverage when the static analysis is imprecise while adding very little runtime overhead. This assists in detection of overflows and underflows that write array elements sequentially, which are the most common, regardless of the precision of the static analysis. Since color one is reserved for guard objects, the write check described previously is sufficient to detect attempts to overwrite guard objects.

The guard objects, in an example implementation, are eight-bytes long to match the size of the slots that we record colors for in the color table. The instrumentation to insert these guard objects is different for the stack, heap, and global data sections.

To insert guard objects in the stack, the compiler phase that lays out local variables in a stack frame is replaced by a new implementation. In an example implementation, safe local variables are segregated from unsafe ones to reduce the space overhead. Contiguous storage is allocated for the safe local variables and then storage is allocated for the guard objects, pads (where required), and unsafe local variables. Through use of segregation is only necessary to insert n+1 guard objects and pads for n unsafe local variables: the guard object that prevents overflows of a variable prevents underflows of the next variable. In another example, the segregation does not occur, but this requires more guard objects.

In the rare case where a function argument is written by an unsafe instruction, it is not easy to insert guard objects and pads around it. Therefore, the argument may be copied to a local variable and the instructions rewritten to refer to the copy. This local variable is marked unsafe and guard objects and pads are inserted around it.

All heap-allocated objects are marked as unsafe but in this implementation pads or guard objects are not inserted around them. The standard heap allocator in Windows Vista, Windows XP SP2, and Windows 2003 inserts an eight-byte header before each allocated object and this header may be used as a guard object by simply setting its color to one in the color table. If another operating system is used that does not insert such a header, guard objects may be used. Since heap objects and headers are eight-byte aligned, pads are not required. This optimization in which headers are used as guard objects avoids space overhead, which could be significant for programs with many small allocations. In systems with different heap allocators, a similarly low overhead may be achieved by modifying the allocator.

Guard objects and pads may be added between all variables in the .data section and .bss sections but not in the read-only data section (.rdata), since the checks are for write integrity (and not read integrity in this examples). The same optimizations may be used as described for the stack; however experimental results show that they would have little impact on overall performance when applied to globals.

Figure 10:
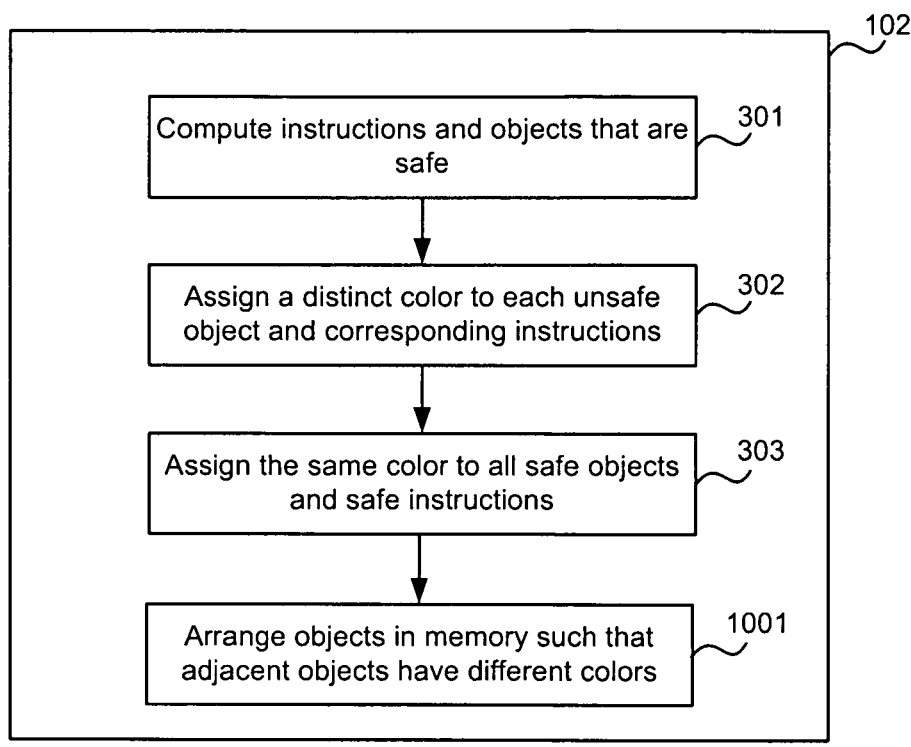
FIG. 10 shows a further example implementation of method block from FIG. 1 in more detail.

In another example implementation, as shown in FIG. 10, the stack and global objects may be laid out such that adjacent objects have different colors (block 1001). This avoids the need for most guard objects and provides an optimization which reduces memory overhead. In an example, unsafe objects may be laid out such that they are between two safe objects.

The color table entries for global variables and their guard objects are initialized at program start-up. The color table entries corresponding to the first instructions of allowed indirect call targets are also initialized at program start-up. The color table is then updated dynamically when objects are allocated on the stack or the heap.

Figure 11:
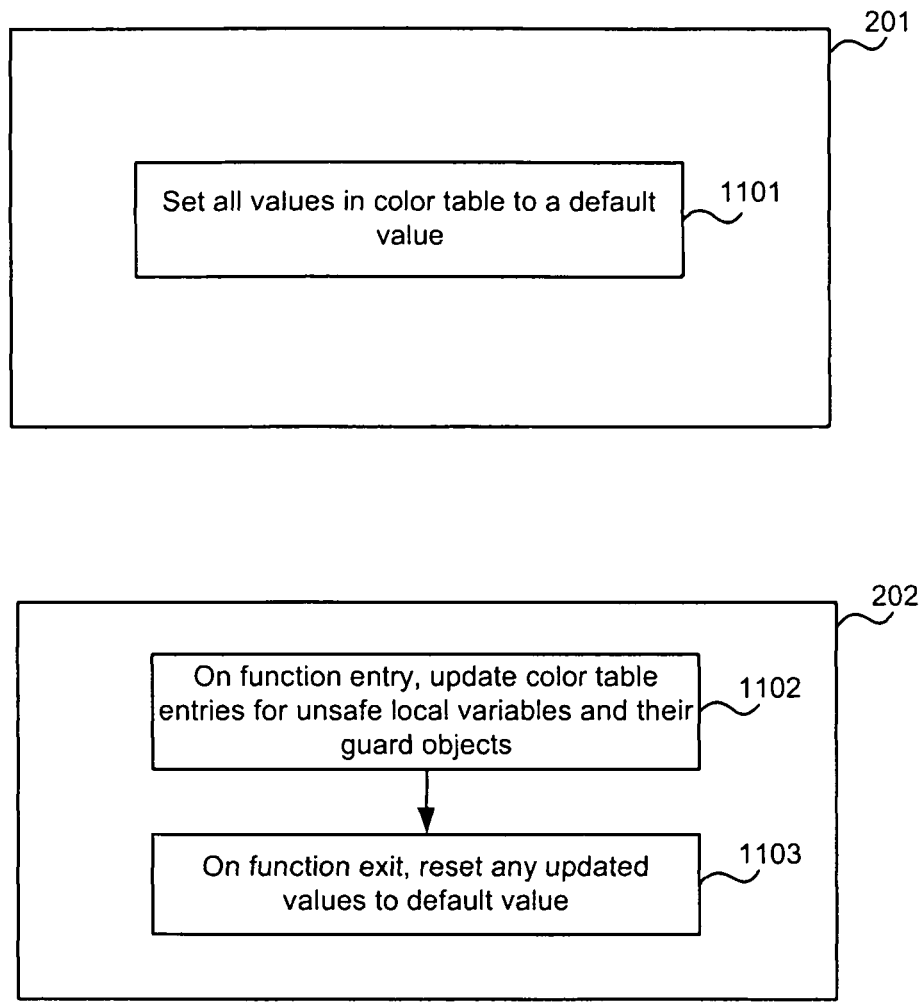
FIG. 11 shows an example implementation of method blocks from FIGS. 2 and 6 in more detail.

An optimization may be used to reduce the cost of updating the color table when a new stack frame is allocated, as shown in FIG. 11. Instead of updating the color table entries for all objects in the stack frame (e.g. in block 202), only the color table entries corresponding to unsafe local variables and their guard objects are updated on function entry (block 1102). On function exit, the entries that were updated on function entry are reset to a default value, such as zero, the color of safe objects (block 1103). The operating system zeroes the pages of the color table (or sets the values to some other default value) when they are accessed for the first time (block 1101).

Function prologues and epilogues are instrumented (in block 103) to set and reset color table entries. The following example shows the instrumentation added to the prologue of a function with a single unsafe local variable with 12 bytes:

```
        push    ecx
        lea     ecx,[ebp-28h]
```

-continued

```
shr    ecx,3
mov    dword ptr [ecx+40000000h],0020200h
pop    ecx
```

The instrumentation saves ecx on the stack to use it as a temporary. Then it loads the address of the first guard object (epb-28h) into ecx and shifts it by three to obtain the index of the guard object's color table entry. It uses this index to set the color table entries to the appropriate colors. One color table entry is set for each guard object. For an unsafe object of size s, ⌈s/8⌉ color table entries are set when ⌈s/4⌉ is odd and ⌈s/8⌉+1 when ⌈s/4⌉ is even (as described above). 2-byte and 4-byte moves may be used to reduce the space and time overhead of the instrumentation whenever possible. In this example, the mov updates the four color table entries: the entries corresponding to guard objects are set to zero and those corresponding to the unsafe local variable are set to two. The final instruction restores the original value of ecx. The instrumentation for function epilogues is identical except that it sets the color table entries to zero.

An alternative approach would be to update color table entries only on function entry for all objects in the stack frame. This alternative adds significantly higher overhead because on average only a small fraction of local variables are unsafe. Additionally, the approach described above incurs no overhead to update the color table when functions have no unsafe locals or arguments, which is common for functions that are invoked often.

The methods described herein protect compiler-generated control data in the stack from unsafe writes, regardless of the precision of the static analysis, because the storage locations holding this data have color zero. This data includes common attack targets like return addresses, saved base pointers, and exception handlers. Therefore, control-flow integrity can be enforced without the overhead of checking control transfers on returns and exception handling.

The color table may also be updated when heap objects are allocated or freed. This may be achieved by instrumenting the code to call wrappers of the allocation functions, for example, malloc and calloc. These wrappers receive the color of the object being allocated as an additional argument, call the corresponding allocator and then set the color entries for the allocated object to the argument color. They set ⌈s/8⌉ color table entries for an object of size s. They also set the color table entries for the eight-byte slots immediately before and after the object to color one. These two slots contain a chunk header maintained by the standard allocator in Windows. In this way, these headers are guard objects. Calls to free may also be replaced by calls to a wrapper. This wrapper sets the color table entries of the object being freed to one and then invokes free.

The heap management data structures are a frequent target of attacks. WIT protects them from corruption by unsafe writes because they have color one or zero. The write checks on free also protect these data structures from corruption due to incorrect use of free. Therefore, WIT can prevent corruption of heap management data structures regardless of the precision of the static analysis and it requires no changes to the standard allocator in Windows to achieve this.

WIT also provides protection from unsafe writes for all data that is allocated by libraries or the operating system in the process address space. All this data will have color zero by default. For example, it prevents unsafe writes into the Process Environment Block, which contains parameters associated with the current process that are used by the operating system. It also protects the data structures used for dynamic linking, for example, the import address table (IAT). Since the IAT is protected, the cost of enforcing control-flow integrity can be reduced further by not performing checks on indirect calls through the IAT.

As described above WIT has a small runtime that includes an initialization function and some wrappers for runtime functions, for example, for malloc and free. In an example implementation, the initialization function allocates the color table using VirtualAlloc, which reserves virtual memory for the table without adding space overhead for pages that are not accessed. The operating system zeroes the pages in the table when they are first accessed. The initialization function sets the color table entries for globals and their guard objects, and for the entry points of indirect call targets. The runtime (libc) start-up function may be instrumented to invoke the initialization.

Since there are many memory errors due to incorrect use of libc functions, a version of libc instrumented with WIT may be used. If the variant of WIT described in the previous sections is used, a different libc binary is required for each program. Alternatively, a specific variant of WIT for libraries may be used. This variant assigns the same well known color (different from zero or one) to all objects allocated by the library, and before writes it checks that the color of the location being written is greater than one, that is, that the location is not a safe object or a guard object. These checks prevent libc functions from violating control-flow integrity. They also prevent all common buffer overflows due to incorrect use of libc functions. However, they cannot prevent attacks that overwrite an unsafe object by exploiting format string vulnerabilities with the % n format specifier, but these can be prevented with static analysis.

Wrappers are used for libc functions that are written in assembly (for example, memcpy and strcpy) and for system calls (for example, recv). These wrappers receive the colors of destination buffers as extra arguments and scan the color table entries corresponding to the slots written by the wrapped function to ensure that they have the right color. Since the color table is very compact, these wrappers introduce little overhead. An alternative to using wrappers is to modify the function to do the checks, with the color pressed in as an argument.

The above examples refer to checking of writes, and in some examples, indirect function calls; however in other examples reads or unsafe reads may also be instrumented so that they are checked at runtime. An unsafe read is a read which may be out of bounds.

In such an example of write integrity testing, the unsafe pointers identified (e.g. in block 802 of FIG. 8) also includes unsafe reads and then the computation of color sets (blocks 803-805) is performed for both unsafe reads and unsafe writes. Reads may be instrumented using instruction sequences identical to those described for write checking. The resulting overhead if unsafe reads are also instrumented (in block 103) is much higher than for unsafe writes and is higher still if all reads are instrumented.

In the methods described above, special colors may be used for special objects which may include one or more of the following:

Safe variables

Guard objects

Compiler generated control data.

The above description refers to the use of a single color table. However, in some examples there may be more than one color table. For example, there may be a different color table for reads a writes and/or for writes and indirect calls. In another example, separate color tables may be provided for different software modules. This may, for example, be used where code is imported and is analyzed separately (to generate a separate color table to the main program) or is analyzed in combination with the main program, although the main program has already been analyzed separately.

Figure 12:
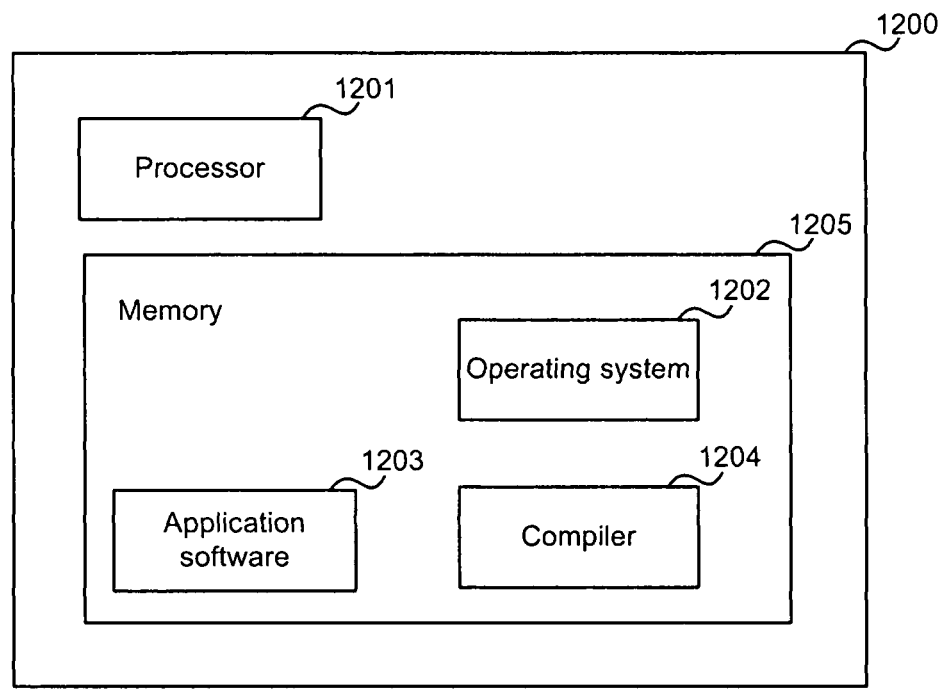
FIG. 12 illustrates an exemplary computing-based device in which embodiments of the methods described herein may be implemented.

FIG. 12 illustrates various components of an exemplary computing-based device 1200 which may be implemented as any form of a computing and/or electronic device, and in which embodiments of WIT may be implemented.

Computing-based device 1200 comprises one or more processors 1101 which may be microprocessors, controllers or any other suitable type of processors for processing computing executable instructions to control the operation of the device in order to perform WIT. The computing-based device may perform the compile-time and/or the runtime component. Platform software comprising an operating system 1202 or any other suitable platform software may be provided at the computing-based device to enable application software 1203-1204 to be executed on the device. The application software may include a compiler 1204 which is arranged to instrument the code at compile time to perform checks against a color table etc. Where the computing-based device 1200 performs the runtime component and not the compile-time component, the application software may not comprise a compiler 1204.

The computer executable instructions may be provided using any computer-readable media, such as memory 1204. The memory may be of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 1200 may comprise one or more inputs e.g. which are of any suitable type for receiving media content, Internet Protocol (IP) input. The device may also comprise a communication interface and one or more outputs, such as an audio and/or video output to a display system integral with or in communication with the computing-based device.

Although the present examples are described and illustrated herein as being implemented in a Windows operating system, the system described is provided as an example and not a limitation. As those skilled in the art will appreciate, the present examples are suitable for application in a variety of different types of operating systems.

Experimental results have shown that the methods described above have low CPU overhead. For example for programs from the SPEC CPU 2000 benchmark suite, the average was 10% and the maximum was 23%, whilst for programs from the Olden benchmark suite, the average was 5% and the maximum was 17%. Theses values are considerably lower than the published values for other techniques for preventing memory errors. The memory overhead introduced by the methods described above is also low compared to known techniques. For SPEC the average memory overhead was 14% and the maximum was 17% and for Olden the average and maximum were both 12%.

Experimental results have also shown that the techniques described above are effective against a wide range of attacks, including, direct overwrite on stack, direct overwrite on data segment, overwrite through stack pointer and overwrite through data segment pointer. The techniques described herein have also been demonstrated to be effective against a set of real vulnerabilities in real applications, including vulnerabilities to databases and HTTP servers.

Whilst the examples above use particular languages, this is by way of example. In other examples, different languages may be used.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. One or more tangible device-readable memory with device-executable instructions for performing acts comprising:
    analyzing a program at compile-time to compute a set of objects associated with each instruction in the program, the set of objects associated with the instruction comprising objects that can be written by the instruction;
    assigning a first color to instructions and associated objects that are identified as safe;
    assigning a second color to an instruction and associated objects that are identified as unsafe;
    for each instruction identified as unsafe, defining a color set associated with the unsafe instruction as a union of the unsafe instruction's associated set of objects and the object pointed to by a pointer associated with the unsafe instruction;
    determining if two color sets intersect;
    if two color sets intersect, creating a new color set by merging the two intersecting color sets;
    repeating the determining and creating steps until each color set is disjoint; and
    assigning a different color to each disjoint color set.

2. One or more tangible device-readable media memory according to claim 1, further comprising generating code to raise an exception, if at runtime, the instruction attempts to write to a memory location with a color which is not the instruction's assigned color.

3. One or more tangible device-readable memory according to claim 1, further comprising generating code to generate and maintain a color table, wherein the color table comprises one color byte for a portion of memory, wherein the portion of memory is larger than one byte.

4. One or more tangible device-readable memory according to claim 3, wherein generating code to generate and maintain the color table comprises generating code to generate the color table with all entries set to the first color.

5. One or more tangible device-readable memory according to claim 3, wherein generating code to generate and maintain the color table comprises:
    generating code to update values in the color table on allocation of objects; and
    generating code to reset said values to the first color on deallocation of objects.

6. One or more tangible device-readable memory according to claim 1, wherein assigning the first color to the instructions and associated objects that are identified as safe and assigning the second color to the instruction and associated objects that are identified as unsafe comprises:
    inserting guard objects between objects which are not safe; and
    assigning a different color to the guard objects.

7. One or more tangible device-readable memory according to claim 1, wherein assigning the first color to the instructions and associated objects that are identified as safe and assigning the second color to the instruction and associated objects that are identified as unsafe comprises:
    arranging objects in memory such that adjacent objects have a different color.

8. One or more tangible device-readable memory according to claim 1, wherein assigning the first color to instructions and associated objects that are identified as safe and assigning the second color to the instruction and associated objects that are identified as unsafe comprises:
    assigning a particular color to any objects allocated by a library.

9. One or more tangible device-readable memory according to claim 2, wherein generating code to raise an exception if, at runtime, the instruction attempts to write to a memory location with a color which is not the instruction's assigned color further comprises:
    generating code to call wrappers of heap allocation functions, the wrappers receiving a color of an object being allocated; and
    setting entries in a color table for the allocated object to said color.

10. One or more tangible device-readable memory according to claim 1, further comprising device-executable instructions for performing acts comprising:
    computing a set of intended target program locations associated with one or more indirect control-flow transfer instructions in the program; and
    generating code to raise an exception, if at runtime, the one or more indirect control-flow transfer instructions attempts to transfer control to a location outside of its associated set of intended target program locations.

11. One or more tangible device-readable memory according to claim 10, further comprising device-executable instructions for performing acts comprising:
    assigning a color to the one or more indirect control-flow transfer instructions and to each of the associated set of intended target program locations,
    and wherein generating code to raise the exception if, at runtime, the indirect control-flow transfer instruction attempts to transfer control to a location outside of its associated set of intended target program location comprises:
        generating code to generate and maintain a color table; and
        generating code to raise an exception, if at runtime, the indirect control-flow transfer instruction attempts to transfer control to a location with a color which is not the indirect control-flow transfer instruction's assigned color.

12. One or more tangible device-readable memory according to claim 10, wherein computing the set of intended target program locations associated with the one or more indirect control-flow transfer instructions in the program comprises:
    computing a set of functions associated with each indirect call in the program, the set of functions associated with an indirect call comprising functions that can be called by the indirect call;
    and wherein generating code to raise the exception, if at runtime, the indirect control-flow transfer instruction attempts to transfer control to the location outside of its associated set of intended target program locations comprises:
        generating code to raise an exception, if at runtime, the indirect call attempts to call a function outside of its associated set of functions.

13. One or more tangible device-readable memory with device-executable instructions for performing acts comprising:
    initializing a color table, wherein the initializing comprises:
        assigning a first color to instructions and associated objects that are identified as safe;
        assigning a second color to instructions and associated object that are identified as unsafe;

for each instruction identified as unsafe, defining a color set associated with the unsafe instruction as a union of the unsafe instruction's associated set of objects and the object pointed to by a pointer associated with the unsafe instruction;

determining if two color sets intersect;

if two color sets intersect, creating a new color set by merging the two intersecting color sets;

repeating the determining and creating steps until each color set is disjoint; and assigning a different color to each disjoint color set;

checking the color table on a write instruction to a memory location;

if a color associated with the write instruction is not the same as a color of the memory location, raising an exception;

checking the color table on an indirect control-flow transfer instruction which transfers control to a target location; and if a color associated with the indirect control-flow transfer instruction is not the same as a color of the target location, raising the exception.

14. One or more tangible device-readable memory according to claim 13, further comprising device-executable instructions for performing acts comprising:

updating the color table on allocation and deallocation of objects.

15. One or more tangible device-readable memory according to claim 14, wherein updating the color table on allocation and deallocation of objects comprises:

on function entry, updating color table entries for unsafe local variables; and on function exit, resetting color table entries for said unsafe local variables to a default value.

16. A method comprising:

computing a set of objects associated with each instruction in a program, each set of objects comprising the objects in the program that can be written by the associated instruction;

determining if an instruction is safe or unsafe;

if an instruction is safe, assigning a color to the instruction; and if the instruction is unsafe, assigning a different color to the instruction;

for each unsafe instruction, defining a color set associated with the unsafe instruction as a union of the instruction's associated set of objects and the object pointed to by a pointer associated with the instruction;

determining if two color sets intersect;

if two color sets intersect, creating a new color set by merging the two intersecting color sets;

repeating the determining and creating steps until each color set is disjoint;

assigning a different color to each disjoint color set; and adding instructions to the program at compile-time to generate and maintain a color table and to check the color table before an unsafe write.

* * * * *